(12) United States Patent
Florian et al.

(10) Patent No.: US 7,783,633 B2
(45) Date of Patent: Aug. 24, 2010

(54) DISPLAY OF RESULTS OF CROSS LANGUAGE SEARCH

(75) Inventors: Radu Florian, Danbury, CT (US); Martin Franz, Yorktown Heights, NY (US); Jeffrey Scott McCarley, Brewster, NY (US); Robert Todd Ward, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 10/992,919

(22) Filed: Nov. 19, 2004

(65) Prior Publication Data
US 2006/0111893 A1 May 25, 2006

(51) Int. Cl.
*G06F 7/00* (2006.01)
*G06F 17/00* (2006.01)

(52) U.S. Cl. .............. 707/729; 704/1; 715/256; 715/264; 707/722; 707/728; 707/736; 707/754

(58) Field of Classification Search ............ 715/247, 715/256, 264
See application file for complete search history.

(56) References Cited

U.S. PATENT DOCUMENTS

| | | | | |
|---|---|---|---|---|
| 5,278,980 A | * | 1/1994 | Pedersen et al. ............ | 707/4 |
| 5,819,260 A | * | 10/1998 | Lu et al. ............ | 707/3 |
| 5,895,464 A | * | 4/1999 | Bhandari et al. ............ | 707/3 |
| 5,933,822 A | * | 8/1999 | Braden-Harder et al. ...... | 707/5 |
| 5,987,402 A | * | 11/1999 | Murata et al. ............ | 704/2 |
| 5,987,457 A | * | 11/1999 | Ballard ............ | 707/5 |
| 6,055,528 A | * | 4/2000 | Evans ............ | 707/3 |
| 6,108,620 A | * | 8/2000 | Richardson et al. ............ | 704/9 |
| 6,604,101 B1 | * | 8/2003 | Chan et al. ............ | 707/4 |
| 7,103,531 B2 | * | 9/2006 | Moore ............ | 704/5 |
| 7,111,237 B2 | * | 9/2006 | Chan ............ | 715/536 |
| 2004/0006560 A1 | * | 1/2004 | Chan et al. ............ | 707/3 |
| 2005/0049852 A1 | * | 3/2005 | Chao ............ | 704/9 |
| 2006/0015322 A1 | * | 1/2006 | Moore ............ | 704/5 |
| 2006/0129915 A1 | * | 6/2006 | Chan ............ | 715/512 |

FOREIGN PATENT DOCUMENTS

WO    WO2004/042615    *    5/2004

OTHER PUBLICATIONS

Y. Al-Onaizan, R. Florian, M. Franz, H. Hassan, Y. S. Lee, S. McCarley, K. Papineni, S. Roukos, J. Sorensen, C. Tillmann, T. Ward, F. Xia, "TIPS: A Translingual Information Processing System", Proceedings of HLT-NAACL 2003, Demonstrations , pp. 1-2, Edmonton, May-Jun. 2003.*
Human Language Technology and North American Chapter of Association of Computational Linguistics 2003 Schedule, http://www2.sims.berkeley.edu/research/conferences/hlt-naacl03/hlt-naacl-program.pdf.*

* cited by examiner

*Primary Examiner*—Tim T. Vo
*Assistant Examiner*—Garrett Smith
(74) *Attorney, Agent, or Firm*—Yee & Associates, P.C.; Anne V. Dougherty

(57) ABSTRACT

An improved method, apparatus, and computer instructions displaying search results. A query is received in a first language. A snippet in the document containing the word is selected in response to identifying a document in a second language in which the document contains a word matching a query word in the query. This snippet is translated into the first language.

15 Claims, 7 Drawing Sheets

DISPLAY OF RESULTS OF CROSS LANGUAGE SEARCH

The U.S. Government has a paid-up license in this invention and the right in limited circumstances to require the patent owner to license others on reasonable terms as provided for by the terms of contract number N66001-99-2-8916 awarded by the Defense Advanced Research Projects Agency.

BACKGROUND OF THE INVENTION

1. Technical Field

The present invention relates generally to an improved data processing system and in particular to a method, apparatus, and computer instructions for processing data. Still more particularly, the present invention relates to a method, apparatus, and computer instructions for presenting search results.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. A browser is a program capable of submitting a request for information identified by an identifier, such as, for example, a URL. A user may enter a domain name through a graphical user interface (GUI) for the browser to access a source of content.

Browsers are often used to search for content, such as Web pages or documents. Users commonly employ search engines to find documents when researching topics for personal interests, academic purposes, or work. A user enters one or more words to form a query. This query is typically entered into a global Web page. The query is then submitted to a search engine, which returns results to a user. Typically, the results are returned in the same language as the query. Cross-language search systems are available for users to search for documents in other languages. For example, in a cross-language search system, a user may enter a query in English, and the search system finds and displays parts of French documents that are relevant to the query. In this example, the query language is English, and the document language is French. Cross-language search systems are established technology.

SUMMARY OF THE INVENTION

The present invention recognizes that presenting results that are meaningful to an English speaking user, who may have only limited reading knowledge of French or no knowledge at all, is a principal challenge in designing a cross-language search system. Thus, it would be advantageous to have an improved method, apparatus, and computer instructions for presenting results for documents in one language suitable for a user with no knowledge of that language. For example, an improved system for presenting documents in French to a user who speaks English in a manner that allows that user to comprehend and use those results is provided by an illustrative embodiment.

The present invention provides an improved method, apparatus, and computer instructions displaying search results. A query is received in a first language. A snippet in the document containing the word is selected in response to identifying a document in a second language in which the document contains a word matching a query word in the query. This snippet is translated into the first language.

BRIEF DESCRIPTION OF THE DRAWINGS

The invention as well as a preferred mode of use, further objectives, and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
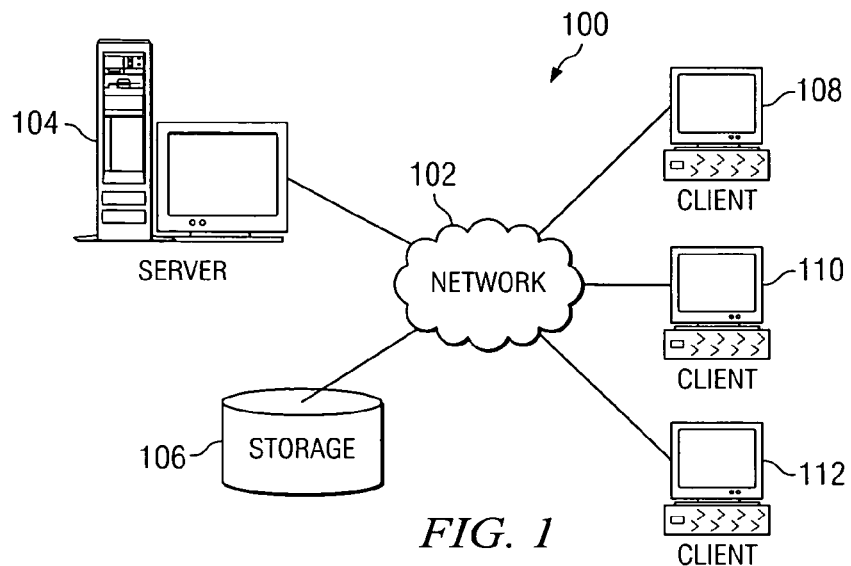
FIG. 1 is a pictorial representation of a network of data processing systems in which exemplary aspects of the present invention may be implemented.

With reference now to the figures, FIG. 1 depicts a pictorial representation of a network of data processing systems in which exemplary aspects of the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation.

Figure 2:
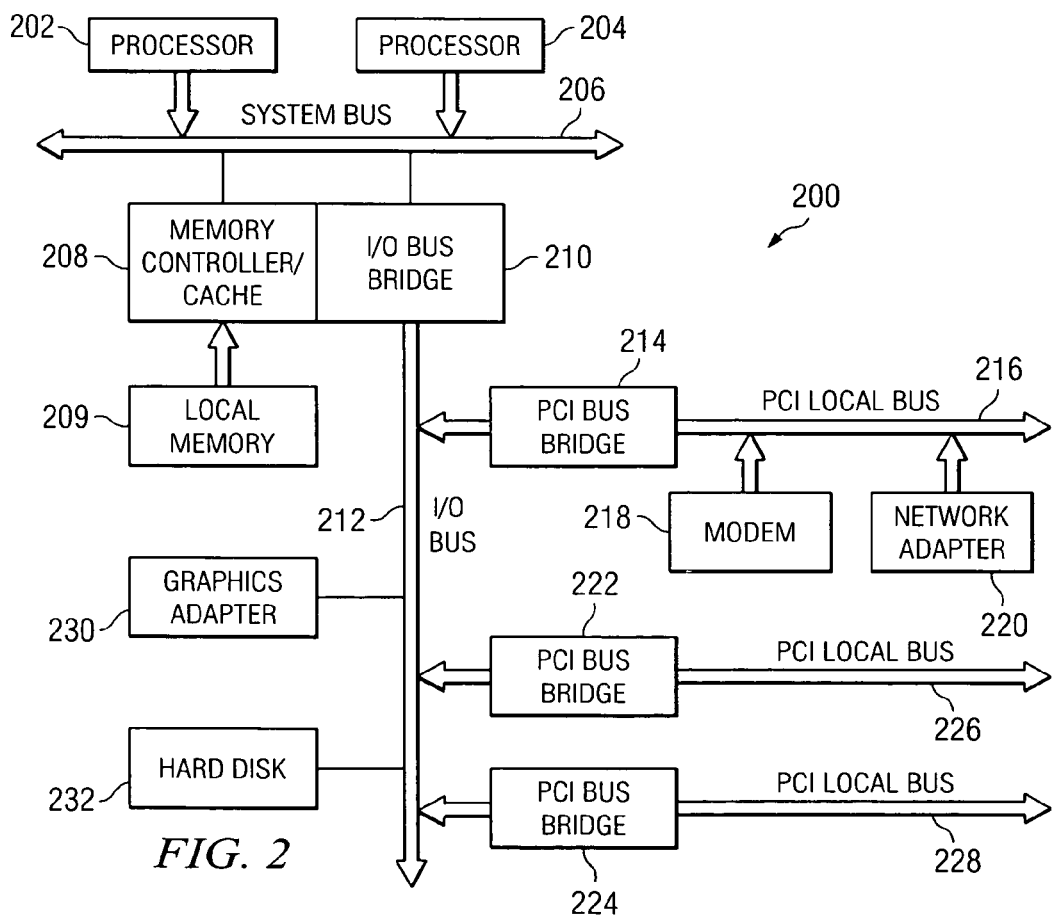
FIG. 2 is a block diagram of a data processing system that may be implemented as a server in accordance with an illustrative embodiment.

Referring to FIG. 2, a block diagram of a data processing system that may be implemented as a server, such as server 104 in FIG. 1, is depicted in accordance with an illustrative embodiment. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to exemplary aspects of the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
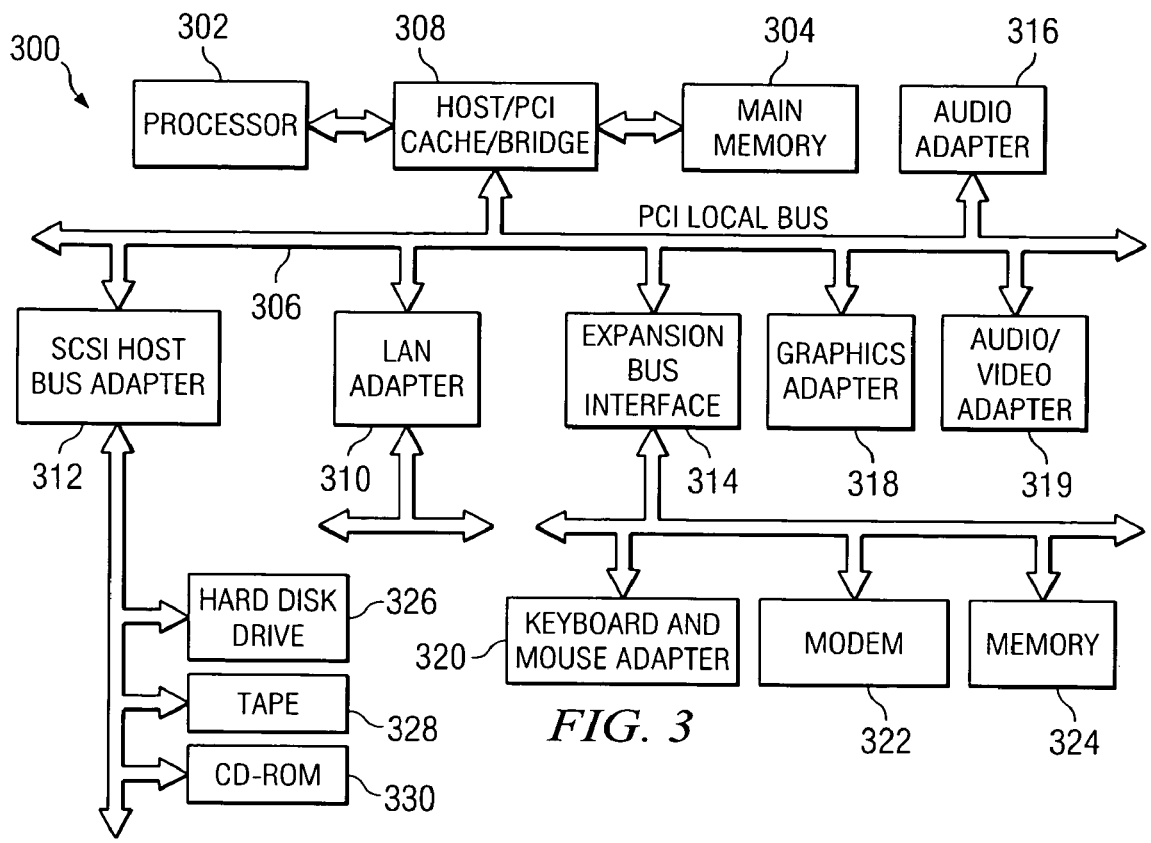
FIG. 3 is a block diagram illustrating a data processing system in which an illustrative embodiment may be implemented.

With reference now to FIG. 3, a block diagram illustrating a data processing system is depicted in which an illustrative embodiment may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of exemplary aspects of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention recognizes that in presenting documents in a different language than the query language, translating the entire document is time consuming and should be avoided when possible. The illustrative embodiments include a cross-language search system that provides translated text snippets, a graphical object representing the document also may be presented. Graphical indicators are displayed in or in association with the graphical object to indicate the presence of a query word matching a word in the document as well as a relative position of a relative word within the document. The term matching as used herein means a literal match of the tokens in the reformulated query with the tokens in the document. A reformulated query is one or more tokens that could be translated into one or more tokens in the query. A token is a unit for searching documents. A token may be, for example, a word or a portion of a word. A token also may be, for example, a phrase or a single character.

Figure 4:
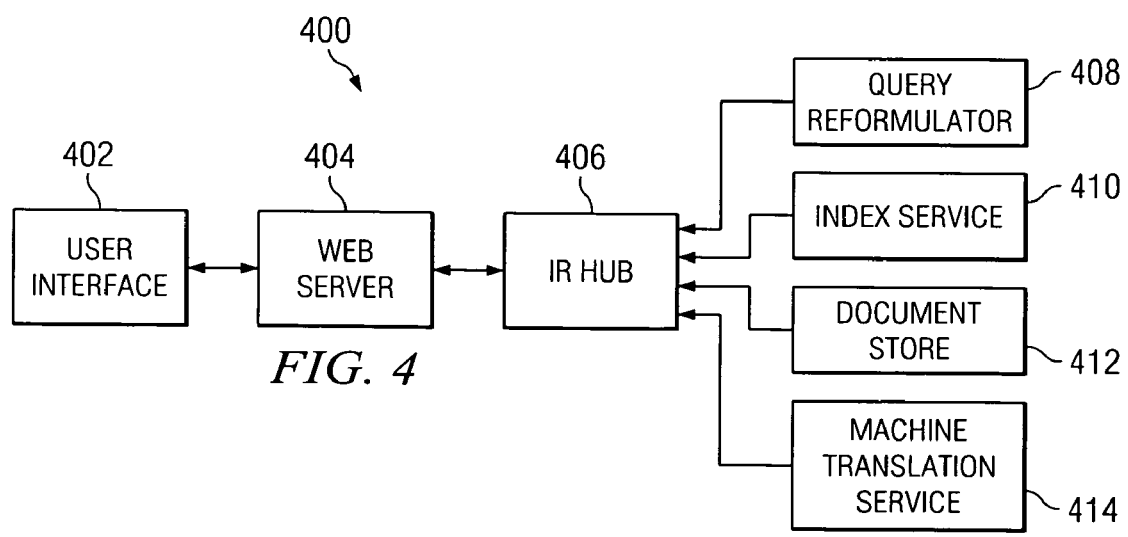
FIG. 4 is a diagram of a cross-language search system in accordance with an illustrative embodiment.

Turning to FIG. 4, a diagram of a cross-language search system is depicted in accordance with an illustrative embodiment. In this example, cross-language search system 400 includes user interface 402, Web server 404, information retrieval (IR) hub 406, query reformulator 408, index service 410, document store 412, and machine translation service 414. In this example, user interface 402 takes the form of a Web browser, which displays an HTML page sent by Web server 404. The HTML page is created by a common gateway interface (CGI) script that runs on the Web server. CGI is a specification for transferring information between a World Wide Web server and a CGI program A CGI program is any program designed to accept and return data that conforms to the CGI specification. Web server 404 mediates between the user at user interface 402 and the rest of cross-language search system 400, which Web server 404 accesses via IR hub 406.

In this illustrative example, IR hub 406 takes a query received in English and sends the query to query reformulation server 408. This component reformulates the query as an (unordered) set of French tokens and associated weights. These tokens are then sent to index service 410. This service returns a ranked list of document identifiers and scores of documents that contain these tokens and which are presumed to be relevant to the user's original query.

In these illustrative examples, the document language is in French and the query language is in English. The document identifiers are sent to document store 412. Document store 412 is a data store, which provides persistent storage of data. This document store returns the text of the document along with precomputed information. This precomputed information may include information, such as named entities, like proper nouns like names of people, locations, and organizations. Machine translation service 414 in this illustrative embodiment is a French to English machine translation system that IR hub 406 uses to translate either the entire document or part of the document to pass back to the Web server 404 for presentation to the user at user interface 402. In these illustrative examples, snippets are translated into the language used for the request.

After IR hub 406 has retrieved a set of documents, the contents and annotations of the documents are returned to the Web server 404, which formulates the results page for the browser to display to the user at user interface 402. Cross-language search system 400 may be implemented in different ways in addition to this illustrative embodiment. For example, cross-language search system can be implemented not only with Web-oriented tools such as HTML and CGI as described above, but in any client-server environment. Furthermore, the functionalities of the various components described above can be distributed differently between the actual subsystems. For example, all of the components can be unified into a single program.

Figure 5:
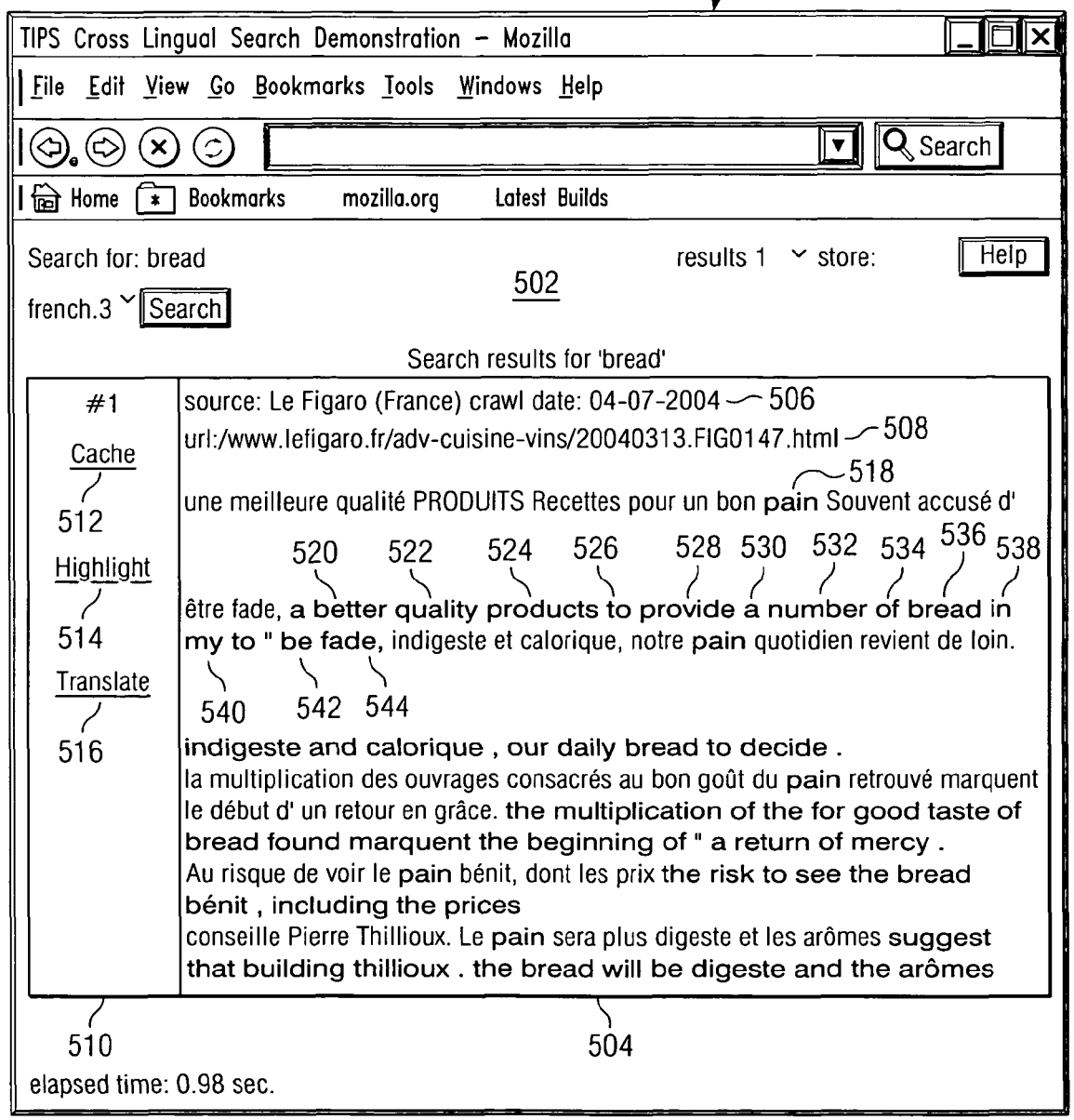
FIG. 5 is a diagram of a results page in accordance with an illustrative embodiment.

Turning now to FIG. 5, a diagram of a results page is depicted in accordance with an illustrative embodiment. Results page 500 is an example of a results page displayed by a browser, such as the one implemented for user interface 402 in FIG. 4. In this illustrative example, only the top scoring document is shown. Often, several of the top scoring documents may be shown. Field 502 contains the query entered by the user. Section 504 displays the results of the query. The results are sorted by score in results page 500. For each document, a source and country along with the date the document entered the system is shown in line 506. This date also is referred to as a crawl date. The original URL of the document is shown in line 508. Section 510 in results page 500 contains links 512, 514, and 516. Link 512 is used to cause a cached copy of the entire document to be displayed. In this manner, the data processing system does not have to go back to the Web site to retrieve the document. Selection of link 514 displays a cached copy of the document and causes words in the document matching query terms in section 504 to be highlighted. Link 516 is employed to cause the entire document to be translated.

Word 518 is highlighted because this word matches a token in the reformulated query. Words 520, 522, 524, 526, 528, 530, 532, 534, 536, 538, 540, 542, and 544 are a machine translation of the snippet and are highlighted to make these words distinguishable from other text. As illustrated in results page 500, the content of a retrieved page is summarized in a compact form for use by a monolingual user. As depicted in FIG. 5, the summarizing of the content of a document in another language is performed by extracting one or more query dependent sub-strings from the document and displaying translations for the sub-strings. A sub-string also is called a snippet. A snippet is typically generated by scanning a document for terms that match the reformulated query terms. These query terms are transformed into reformulated query terms by translating the terms from the query language, such as English, to the document language, such as French.

Query words also may be highlighted in the snippets, as described with respect to results page 500 in FIG. 5. More specifically, snippet words whose stems are in the reformulated query generated by query reformulator 408 in FIG. 4 are highlighted in the document-language view of the snippet. The highlight color corresponds to the original query word. Thus, if the original query is "Germany Spain", the document language snippets (in English-French system) will contain the highlighted words "Allemagne" and "Espagne", and the translated snippets will highlight "Germany", "German", and "Spain". Basing the highlighting of the translated snippet on its alignment to the document-language snippet would allow "Spanish" to be highlighted for the above query.

Figure 6A:
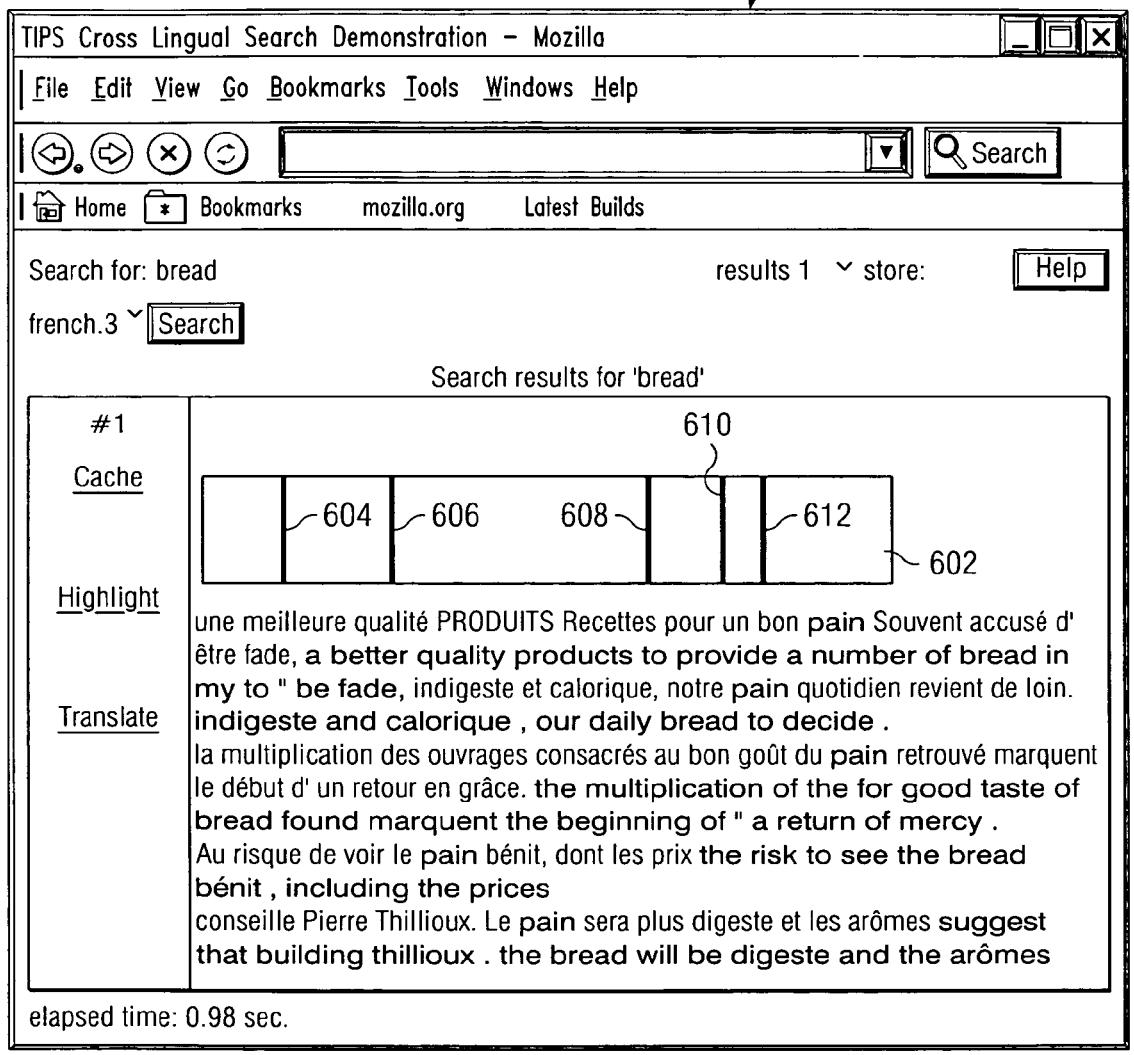
FIGS. 6A and 6B are diagrams illustrating the use of graphical object for indicating a present of terms in a document matching a query in accordance with an illustrative embodiment.
Figure 6B:
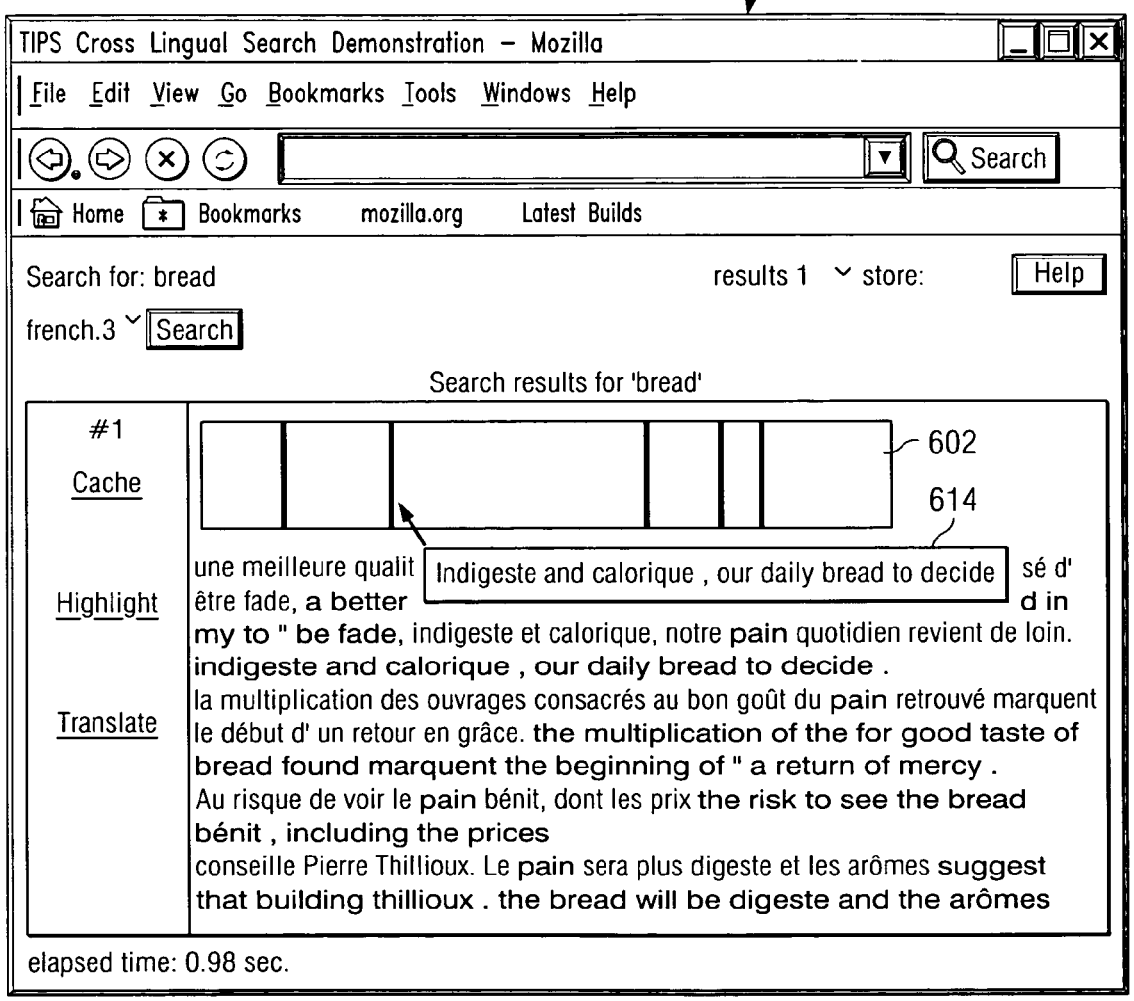

With reference next to FIGS. 6A and 6B, diagrams illustrating the use of graphical object for indicating a present of terms in a document matching a query are depicted in accordance with an illustrative embodiment. In FIG. 6A, results page 600 in this example similar to results page 500 in FIG. 5. Results page 600 also includes matching bar 602. This matching bar is a graphical object used to indicate the presence and relative position of terms in the document matching query words. Matching bar 602 in this example may float above the results page or elsewhere in the document display page. This graphical object may be fixed or movable depending on the particular implementation.

As illustrated, matching bar 602 contains lines 604, 606, 608, 610, and 612. These lines are colored and depict the approximate positions in the document in which document terms match the query. For example, if most of the query words occur near the end of the document, corresponding positions near the right edge of matching bar 602 will be colored. In this illustrative example, matching bar 602 is implemented even when the query language is not the same as the document language, and thus exact spelling-based matches are unlikely. For example, if the query is "Germany Spain", the term matching bar will indicate the approximate positions of all occurrences of "Allemagne" in the document using a color, such as red, and all occurrences of "Espagne" in the document using a color, such as green.

In FIG. 6B, matching bar 602 supports a mouse-over, which displays a snippet of text containing the matching word or a translation of the snippet as shown in window 614. Additionally, matching bar 614 also may be used for navigation. For example, selecting a particular word in window 614 takes the user to the part of the document that contains the matching word. Further, a user may select a line, such as line 606 to cause the document to be displayed at that location.

Figure 7:
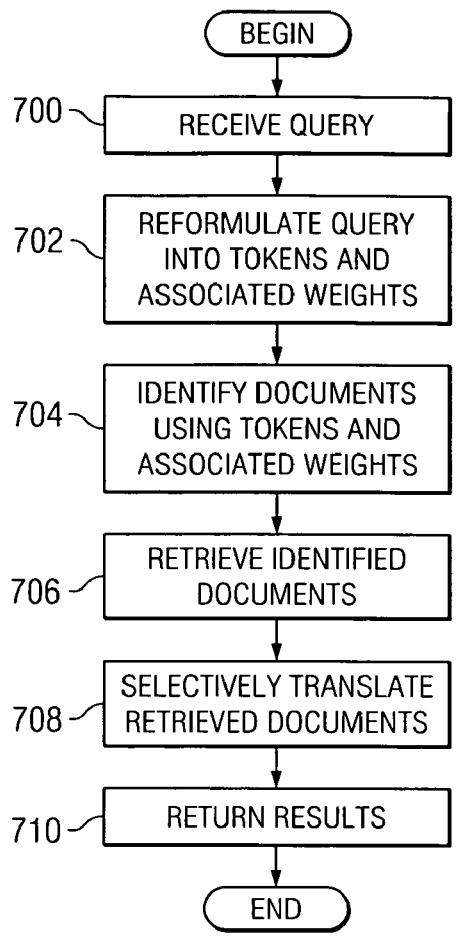
FIG. 7 is a flowchart of a process for identifying documents in accordance with an illustrative embodiment.

Turning now to FIG. 7, a flowchart of a process for identifying documents is depicted in accordance with an illustrative embodiment. The process illustrated in FIG. 7 may be implemented in a cross-language search system, such as cross-language search system 400 in FIG. 4. Specifically, this process may be implemented in an information retrieval hub, such as IR hub 406 in FIG. 4.

The process begins by receiving a query (step 700). This query is receiving through a server from a user interface, such as Web server 404 and user interface 402 in FIG. 4. The query is reformulated into tokens and associated weights (step 702). Step 702 is performed by sending the query to a query reformulator, such as query reformulator 408 in FIG. 4. Documents are identified using tokens and associated weights (step 704). In step 704, the documents are identified by sending the tokens and associated weights to an index service, such as index service 410 in FIG. 4. The process retrieves identified documents (step 706). The documents are retrieved from a data store, such as document store 412 in FIG. 4. A retrieved document is selectively translated (step 708). This translation is provided by sending portions or the entire retrieved document to a service, such as machine translation service 414 in FIG. 4. The process then returns results (step 710) with the process terminating thereafter.

In selecting or creating snippets from a document, a window is selected around each match of a word in the document. If there is an additional match within the window, then the window is extended. In the illustrative embodiments, snippets are scored based on a number of factors, which may include, for example, the number of words matched, translation probabilities of words, and coverage of the query (so that occurrences of different words score higher than multiple occurrences of the same word).

Since the snippet is translated automatically in these examples, and computer translation is currently an imperfect technology, it is advantageous to adjust the boundaries of the snippets beyond exact matches of words in the document to words in the query to improve translation readability. In these examples, the boundaries of snippets are adjusted to avoid starting or ending on certain words and/or punctuation. For example, ending a snippet with a determiner should be avoided, whereas starting a snippet with a preposition is likely to be good. It may also be desirable to select snippets so that they cover complete sentences or clauses, within length constraints. Other useful factors may include part-of-speech tags of the words rather than the words themselves, and language model probabilities of sentence boundaries.

Another expedient strategy for improving snippet quality involves generating too many snippets, translating all of the generated snippets, and then selecting snippets to display based on the translations, rather than selecting the snippets based on their original text prior to translation. For example snippets, whose translation includes the original English query words, are clearly preferable. The snippets may be selected on the basis of the translation model score or by calculating a retrieval model score of the query given the snippet. In addition to similarity to the query, snippets also may be rejected based on their similarity to each other, to avoid redundancy in the display. Further, the position of the snippet in the page may be considered, in order to sample uniformly from the page, or to emphasize the beginning or the end of the page.

Figure 8:
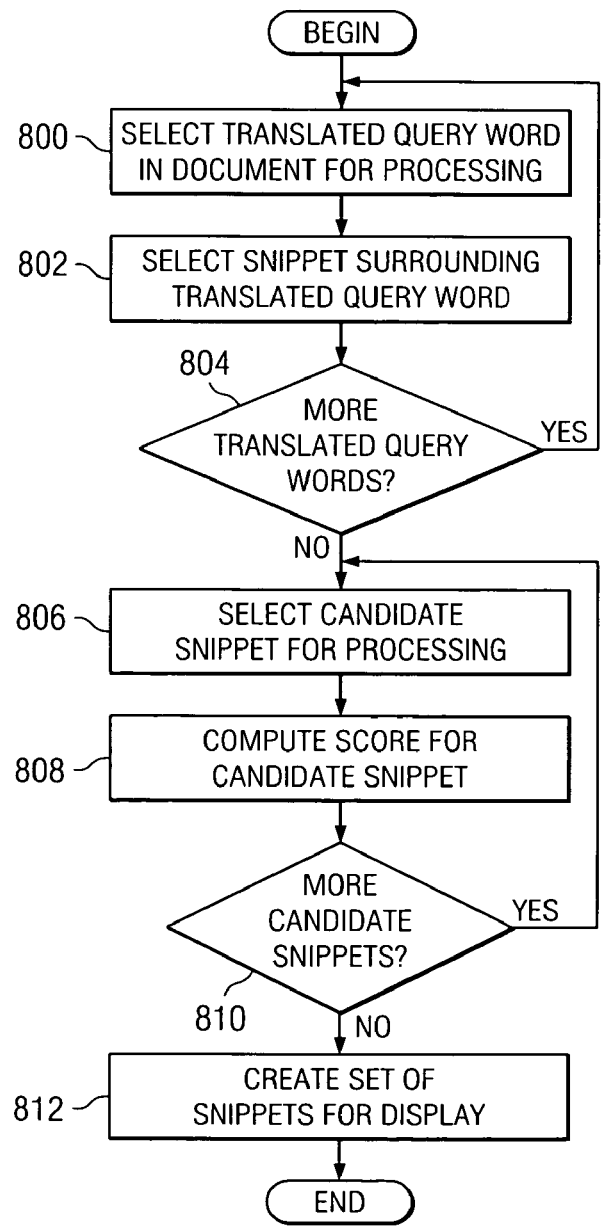
FIG. 8 is a flowchart of a process for selecting and creating snippets in accordance with an illustrative embodiment.

Turning to FIG. 8, a flowchart of a process for selecting and creating snippets is depicted in accordance with an illustrative embodiment. The process illustrated in FIG. 8 may be implemented in a cross-language search system, such as cross-language search system 400 in FIG. 4. Specifically, this process may be implemented in an information retrieval hub, such as IR hub 406 in FIG. 4. This process is a more detailed description of a selection of portions of a document for translation as founding step 708 in FIG. 7.

The process begins by selecting a translated query word in a document for processing (step 800). The selected word is one that has not yet been processed.

A snippet surrounding the query word is selected (step 802). A determination is made as to whether additional translated query words that have not been processed are present (step 804). If a translated query word is not present, a candidate snippet is selected for processing (step 806). Next, a score for the candidate snippet is computed (step 808). This score may be calculated in a number of different ways. For example, the score may be computed with respect to translated query words. With this type of scoring, the score may be calculated as follows:

$$\text{score} = \sum_i \log\left(\sum_j t(q_i | d_j)\right)$$

where $q_i$ and $d_j$ run over the query words and the document words, respectively, and $t(q_i|q_j)$ is an estimate of the probability of translating the word $d_j$ into $q_i$. Other scoring formulae may be used, which incorporate, for example, measures of the importance of words. In this type of example, matching rare words is better.

A determination is then made as to whether additional unprocessed candidate snippets are present (step 810). If additional unprocessed candidate snippets are not present, a set of snippets is created for display (step 812) with the process terminating thereafter.

Turning back to step 804, if additional unprocessed translated query words are present, the process returns to step 800 to select an additional query word for processing. Referring back to step 810, if more candidate snippets are present, the process returns back to step 806 to select another unprocessed candidate snippet for processing.

Figure 9:
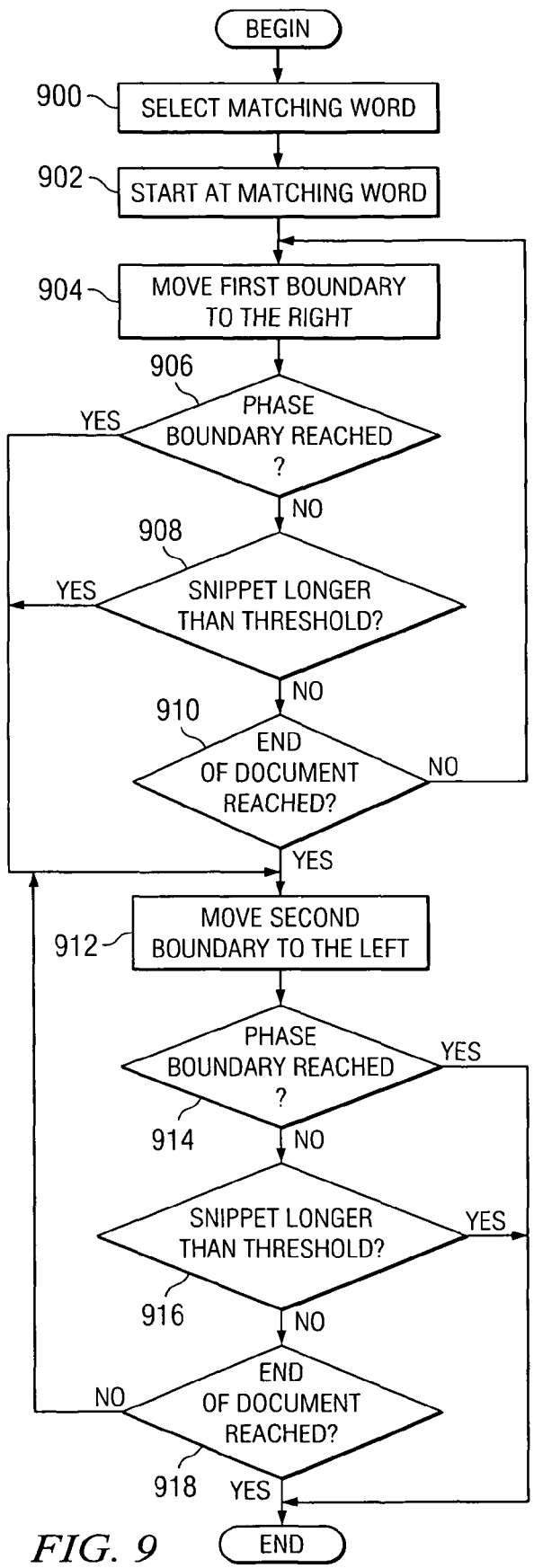
FIG. 9 is a flowchart of a process for selecting or creating a snippet in accordance with an illustrative embodiment.

Turning to FIG. 9, a flowchart of a process for selecting or creating a snippet is depicted in accordance with an illustrative embodiment. The process illustrated in FIG. 7 may be implemented in a cross-language search system, such as cross-language search system 400 in FIG. 4. Specifically, this process may be implemented in an information retrieval hub, such as IR hub 406 in FIG. 4. This process is a more detailed description of step 802 in FIG. 8.

The process begins by selecting a matching word (step 900). The matching word is a word in the document that matches a token in the reformulated query. The process then begins at the matching word to create boundaries for the snippet (step 902). The first boundary is moved to the right of the matching word to add a predefined number of document words to the snippet (step 904). This predefined number may be, for example, one word, two words, or five words. Next, a determination is made as to whether a phrase boundary has been reached (step 906). In these illustrative examples, a phrase boundary is defined based on a set of rules or statistics that may use document words or punctuation, automatically determined part-of-speech tags, or automatic parsing of the document. Example rule includes punctuation, such as ";" or ":", as phrase boundaries. Another rule that may be used is that phrases never end with words, such as "the" or "a".

If a phrase boundary is not reached, a determination is made as to whether the snippet is longer than a threshold (step 908). This threshold is selected as a number of words that is considered to long for a snippet. If the snippet is not longer than the threshold, a determination is made as to whether the end of the document has been reached (step 910). If the end of the document has not been reached, the process returns to step 904 as described above.

Otherwise, the second boundary is moved to the left of the matching word by some predefined number of document words to add words to the snippet (step 912). Next, a determination is made as to whether a phrase boundary has been reached (step 914). If a phrase boundary is not reached, a determination is made as to whether the snippet is longer than a threshold (step 916). This threshold is selected as a number of words that is considered to long for a snippet. If the snippet is not longer than the threshold, a determination is made as to whether the end of the document has been reached (step 918). If the end of the document has not been reached, the process returns to step 912 as described above. If the end of the document has been reached, the process terminates and the snippet has been created or selected.

With reference again to step 906, the process proceeds to step 912 if the phrase boundary has been reached. The process also proceeds to step 912 if the snippet is longer than the threshold. With reference back to step 914, the process terminates if the phrase boundary has been reached. In step 916, the process also terminates if the snippet is longer than the threshold.

Figure 10:
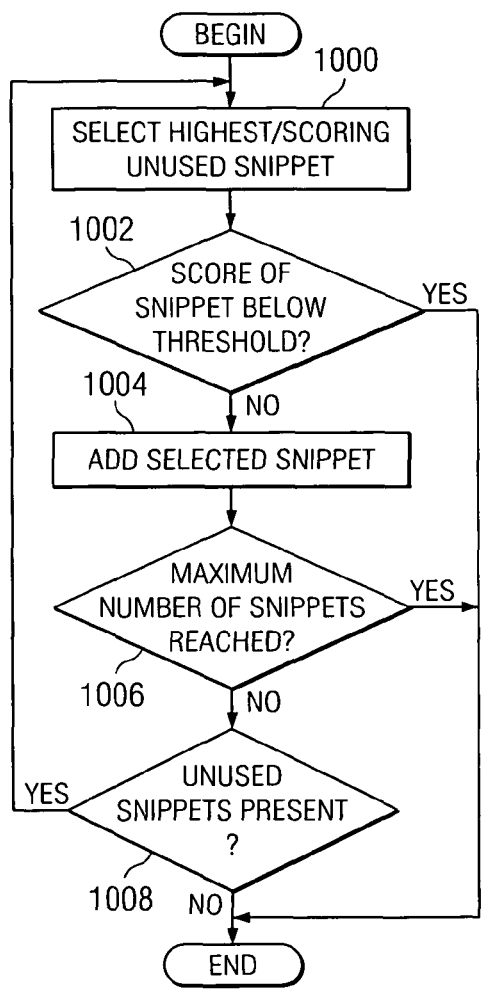
FIG. 10 is a flowchart of a process for selecting snippets for presentation in accordance with an illustrative embodiment.

Turning next to FIG. 10, a flowchart of a process for selecting snippets for presentation is depicted in accordance with an illustrative embodiment. The process illustrated in FIG. 7 may be implemented in a cross-language search system, such as cross-language search system 400 in FIG. 4. Specifically, this process may be implemented in an information retrieval hub, such as IR hub 406 in FIG. 4. This process is an example of a query "slot-filler" process for establishing a set of snippet for display.

The process begins by selecting the highest scoring unused snippet (step 1000). A determination is made as to whether the score of snippet selected in step 1000 is below threshold (step 1002). This threshold may be selected empirically to eliminate bad snippets on a small set of trial documents. If the score of the snippet is not below the threshold, the process adds the selected snippet to the set of snippets for presentation (step 1004). A determination is made as to whether the maximum number of snippets has been reached (step 1006). If the maximum number has not been reached, a determination is made as to whether any unused snippets are present (step 1008). If unused snippets are not present, the process terminates.

Turning back to step 1002, if the score of snippets is below threshold, the process terminates. The process also terminates in step 1006 if maximum number of snippets is reached. Turning back now to step 1008, if unused snippets are present, the process returns to step 1000 to select the next highest scoring unused snippet.

The process illustrated in FIG. 10 may be modified to select snippets through a greedy search based on score. With this type of snippet selection, step 1000 is modified to select a snippet contain a query word not covered in the set of selected snippets. In other words, snippet containing query words found in a set of selected snippets are not candidates for use in step 1000.

Thus, the illustrative embodiments provide an improved method, apparatus, and computer instructions for presenting results of a cross-language search. The illustrated mechanisms select snippets and selectively translate words in a manner to improve the usefulness of these results to users. Additionally, a graphical object such as a matching bar is used to provide an identification of the presence of terms in the document matching query words as well as the approximate positions of these terms in the document. As a result the usefulness of a cross-language search is improved for users who have limited knowledge of languages beyond those in which the query is generated.

It is important to note that while exemplary aspects of the present invention has been described in the context of a fully functioning data processing system, those of ordinary skill in the art will appreciate that the processes of exemplary aspects of the present invention are capable of being distributed in the form of a computer readable medium of instructions and a variety of forms and that exemplary aspects of the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of exemplary aspects of the present invention has been presented for purposes of illustration and description, and is not intended to be exhaustive or limited to the invention in the form disclosed. Many modifications and variations will be apparent to those of ordinary skill in the art. For example, the languages used in the illustrative embodiments are English and French. The present invention may be applied to other types of languages including entirely arbitrary languages. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for displaying a search result, the method comprising:
   receiving a query in a first language;
   translating, by the data processing system, the query into a second language to form a token;
   identifying a target document, wherein the target document is identified by performing a search based on the token;
   scanning the target document for the token;
   responsive to scanning the target document, selecting, automatically, based on a set of predefined rules, a snippet associated with at least one instance of the token in the target document, wherein the snippet is less than an entirety of the target document, and wherein the snippet is in the second language;
   responsive to selecting the snippet, translating, automatically, the snippet into the first language; and
   storing the snippet;
   wherein the predefined set of rules comprises a rule to select a boundary for the snippet using a combination of the token and a predefined number of adjacent words and wherein the boundary is selected to keep phrases and clauses unbroken.

2. The method of claim 1 further comprising:
   displaying the snippet as the search result.

3. The method of claim 1 further comprising:
   selecting a second snippet from the target document, wherein the second snippet is based on an additional instance of the token.

4. The method of claim 3 further comprising:
   translating the second snippet into the first language.

5. The method of claim 3, wherein the second snippet is selected to maximize translation scores of document language words.

6. The method of claim 1 wherein the token comprises a first word and a second word and wherein the method further comprises:
   selecting the snippet based on the first word; and
   selecting a second snippet based on the second word.

7. A method in a data processing system for displaying a search result, the method comprising:
   receiving a query in a first language;
   translating, by the data processing system, the query into a second language to form a token;
   identifying a target document, wherein the target document is identified by performing a search based on the token;
   scanning the target document for the token; and displaying a graphical indicator, wherein the graphical indicator indicates a presence of at least one instance of the token in the target document and a relative position of the at least one token within the target document;
   responsive to scanning the target document, selecting, automatically, based on a set of predefined rules, a snippet associated with at least one instance of the token in the target document, wherein the snippet is less than an entirety of the target document, and wherein the snippet is in the second language;
   responsive to selecting the snippet, translating, automatically, the snippet into the first language to form a translated snippet; and
   displaying the translated snippet as the search result;
   wherein the predefined set of rules comprises a rule to select a boundary for the snippet using a combination of the token and a predefined number of adjacent words and wherein the boundary is selected to keep phrases and clauses unbroken.

8. The method of claim 7, wherein the graphical object is a matching bar.

9. The method of claim 8, wherein the graphical indicator is a highlight.

10. The method of claim 1, wherein the step of responsive to scanning the target document, selecting, automatically, based on a set of predefined rules, a snippet associated with at least one instance of the token in the target document, wherein the snippet is less than an entirety of the target document, and wherein the snippet is in the second language, further comprises:
    calculating a score for each snippet of a plurality of snippets using the formula $$\sum_i$$

where $q_i$ and $d_j$ run over the query words and the document words, respectively, and $t(q_i|q_j)$ is an estimate of the probability of translating the word $d_j$ into $q_i$;
    identifying a highest score; and
    selecting the snippet based on the highest score.

11. The method of claim 7, wherein the step of responsive to scanning the target document, selecting, automatically, based on a set of predefined rules, a snippet associated with at least one instance of the token in the target document, wherein the snippet is less than an entirety of the target document, and wherein the snippet is in the second language, further comprises:
    calculating a score for each snippet of a plurality of snippets using the formula $$\sum_i$$

where $q_i$ and $d_j$ run over the query words and the document words, respectively, and $t(q_i|q_j)$ is an estimate of the probability of translating the word $d_j$ into $q_i$;
    identifying a highest score; and
    selecting the snippet based on the highest score.

12. A computer program product comprising:
    computer recordable medium having a plurality of computer useable instructions stored thereon for execution by a computer, the plurality of computer useable instructions adopted to cause a processor of the computer to perform steps comprising:
    receiving a query in a first language; translating the query into a second language to form a token;
    identifying a target document, wherein the target document is identified by performing a search based on the token;
    scanning the target document for the token;
    responsive to scanning the target document, selecting, automatically, based on a set of predefined rules, a snippet associated with at least one instance of the token in the target document, wherein the snippet is less than an entirety of the target document, and wherein the snippet is in the second language;
    responsive to selecting the snippet, translating, automatically, the snippet into the first language; and
    storing the snippet;
    wherein the predefined set of rules comprises a rule to select a boundary for the snippet using a combination of the token and a predefined number of adjacent words and wherein the boundary is selected to keep phrases and clauses unbroken.

13. The computer program product of claim 12, wherein the plurality of computer useable instructions are further adapted to select the snippet by performing steps comprising:
calculating a score for each snippet of a plurality of snippets using the formula $$\sum_i$$

where $q_i$ and $d_j$ run over the query words and the document words, respectively, and $t(q_i|q_i)$ is an estimate of the probability of translating the word $d_j$ into $q_i$;
identifying a highest score; and
selecting the snippet based on the highest score.

14. A data processing system comprising:
a bus;
a storage device connected to the bus, wherein the storage device contains a plurality of computer usable instructions; and
a processing unit connected to the bus, wherein the processing unit executes the plurality of computer usable instructions to receive a query in a first language; translate the query into a second language to form a token; identify a target document, wherein the target document is identified by performing a search based on the token; scan the target document for the token; responsive to scanning the target document, select, automatically, based on a set of predefined rules, a snippet associated with at least one instance of the token in the target document, wherein the snippet is less than an entirety of the target document, and wherein the snippet is in the second language; responsive to selecting the snippet, translate, automatically, the snippet into the first language; and store the snippet;
wherein the predefined set of rules comprises a rule to select a boundary for the snippet using a combination of the token and a predefined number of adjacent words and wherein the boundary is selected to keep phrases and clauses unbroken.

15. The apparatus of claim 14, wherein the processing unit further executes the plurality of computer useable instructions to select the snippet by:
executing the computer useable instructions to calculate a score for each snippet of a plurality of snippets using the formula $$\sum_i$$

where $q_i$ and $d_j$ run over the query words and the document words, respectively, and $t(q_i|q_i)$ is an estimate of the probability of translating the word $d_j$ into $q_i$; and select a snippet with the highest score; identify a highest score; and select the snippet based on the highest score.

* * * * *